Patented May 13, 1941

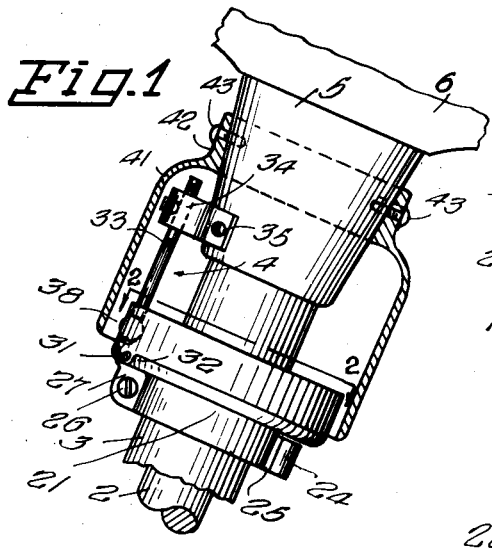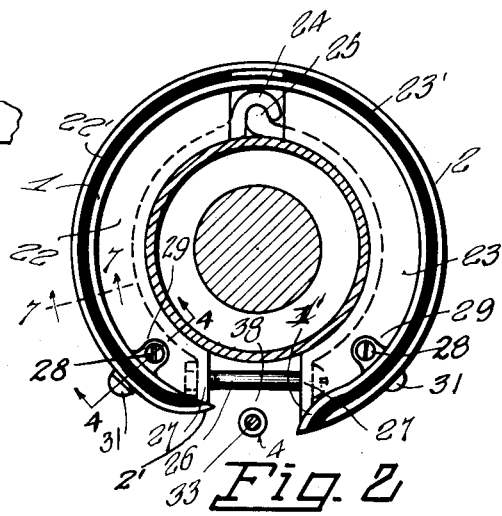

2,241,457

UNITED STATES PATENT OFFICE 2,241,457

SWITCH

Lydia A. Hagler, Otis Orchards, and Sidney E. Smith, Opportunity, Wash.

Application May 7, 1940, Serial No. 333,856

5 Claims. (Cl. 200—59)

This invention relates to direction signals and it is one object of the invention to provide a device of this character adapted to be applied to a vehicle and serve to indicate the direction in which a turn is to be made.

Another object of the invention is to provide a signal including lights mounted in position to be seen from the front or rear of a vehicle and controlled by an improved circuit closer mounted upon the steering column and the steering wheel and adapted to close a circuit to right or left hand signal lights according to the direction in which the steering wheel is turned.

Another object of the invention is to provide a circuit closer including substantially inner and outer circular contact strips mounted about the steering column in insulated relation to each other by a mounting of insulating material which is adapted to be firmly secured about the steering column, the circuit closer also including a contact strip mounted on the hub of the steering wheel and moving therewith into engagement with either the inner or outer contact strip according to the direction in which the steering wheel is turned.

Another object of the invention is to so mount the contact member carried by the steering wheel that it may be longitudinally adjusted and thus shift its lower end to adjusted positions and cause it to have proper engagement with the contact rings or bands carried by the steering column.

Another object of the invention is to provide a circuit closer which is of simple construction and capable of being easily applied to the steering column and the hub of a steering wheel.

The invention is illustrated in the accompanying drawing, wherein:

Fig. 1 is a side elevation showing the improved circuit closer applied to a steering column and the hub of a steering wheel, a shield being shown in section.

Fig. 2 is a sectional view on an enlarged scale, taken on the line 2—2 of Fig. 1.

Fig. 3 is a front view of Fig. 1, with the shield removed and portions shown in section.

Fig. 4 is a sectional view on an enlarged scale, taken on the line 4—4 of Fig. 2.

Fig. 5 is a wiring diagram.

Fig. 6 is a fragmentary view of a modified form of contact carried by the steering wheel.

Fig. 7 is a view similar to Fig. 4, taken on the line 7—7 of Fig. 2.

The circuit closer constituting the subject matter of this invention consists broadly of stationary contact rings or bands 1 and 2 mounted about the steering column 3 in insulated relation to each other and a movable contact member 4 carried by the hub 5 of the steering wheel 6 and moving therewith into position to engage the inner contact band 1 or the outer contact band 2, according to the direction in which the steering wheel is turned. The inner contact band 1 has a conductor 7 leading therefrom to a wire 8 extending between the front and rear signal lights 9, at the right hand side of an automobile or other vehicle which are also connected by a wire 10. A battery 11, grounded as shown at 12, has a wire 13 leading therefrom and provided with branch wires 14 and 15, one of which leads to wire 10 so that when the band 1 is engaged by the movable contact 4, which is grounded as shown at 16, a circuit will be closed through the right hand signal lights and these lights illuminated to indicate that the driver of the vehicle intends to make a right hand turn. The other branch wire 15 leads to a wire 17 extending between the signal lights 18 at the left side of the vehicle and between these lights extends a wire 19 connected with the outer stationary contact band 2 by a wire 20, so that when this stationary contact band is engaged by the movable contact, a circuit will be closed through the lights 18 and indicates that a turn is to be made toward the left.

In order to mount the stationary contact rings or bands in insulated relation to each other, there has been provided a collar 21 consisting of companion sections 22 and 23 which are of arcuate formation and fit about the steering column 3, as shown in Fig. 2. The section or jaw 22 is formed at one end with a hook 24 engaging the outturned lug or bill 25 at the adjoining end of the jaw or section 23. By this arrangement, the two sections are pivotally connected and may be drawn into tight binding engagement with the steering column when a bolt 26 passing through ears 27 at front ends of the two sections, is tightened. The two sections 22 and 23 have upstanding flanges 22' and 23' along their outer margins which fit between the inner and outer contact bands or rings 1 and 2 to mount the bands in insulated relation to each other. The inner band 1 is secured by bolts 28 passing through ears 29 extending inwardly from the band and the outer band 2 rests upon the outer shoulders 30 of the two sections, where it is secured by bolts 31 passing through ears 32 extending downwardly from the band. The wire 7 is engaged with one of the bolts 28 and the wire 20 is connected with one of the bolts 31, as shown in Fig. 4. Therefore, these bolts serve as terminal posts for the wires as well as serving to secure the bands to the flanges of the section 22 and 23 of the collar. Referring to Fig. 2, it will be seen that the front end of the collar section 22' and the end of the band 2 engaging the same are curved inwardly to provide a cam surface 2' and that the front end of section 23' and the end of band 1 engaging the same are curved outwardly to form a cam surface 1'. These cam surfaces serve to engage the movable contact 4 when the steering wheel 6 is turned and cause the movable contact to be flexed into close contacting engagement with the inner band 1 or the outer band 2, according to the direction in which the wheel is turned.

The movable contact consists of a rod or stem 33 which extends vertically at the front of the steering wheel and has its upper portion passing through a bracket 34 secured to the hub 5 of the wheel by screws 35. The rod or stem is formed of resilient conductive material so that it may be flexed into close contacting engagement with the bands 1 and 2 and is secured in set position after being adjusted vertically, by a set screw 36 which serves as a terminal screw for the ground wire 16, it being understood that the wire 16 may be secured to one of the screws 35 if desired. The lower portion of rod 33 is reduced in diameter to provide a spindle 37 about which fits a ball 38 or roller 39, held in place by a screw 40. This ball or roller causes the movable contact to move easily into engagement with the inner band or the outer band, when the steering wheel is turned and also prevents excessive frictional binding during turning of the wheel when making a turn. A shield 41 for enclosing the contacts and protecting them from damage, is disposed about the steering column and has a neck 42 which fits snugly about the hub 5 and is secured by a suitable number of screws 43.

From the foregoing description, the construction and operation of the circuit closer will be readily understood.

Having thus described the invention, what is claimed is:

1. In a device of the character described, an annular body of insulating material for fitting about a steering column, said body consisting of arcuate sections having ends pivotally connected, the other ends of said sections being spaced from each other and provided with ears, a fastener passing through said ears to tighten the sections about the steering column, inner and outer annular contact strips carried by said sections, the inner strip having one end portion extending beyond the corresponding end of the outer strip and curved outwardly to form a cam surface, the outer strip having its other end portion extending beyond the corresponding end of the inner strip and curved inwardly to form a cam surface, and a contact member adapted to be secured to a steering wheel with a portion normally disposed between the spaced ends of the sections in position to be guided into engagement with the contact strips by the cam surfaces when the steering wheel is turned.

2. In a device of the character described, an annular collar of insulating material formed of arcuate sections and having ends pivotally connected and their other ends spaced from each other, means extending between the spaced ends for drawing same toward each other and securing the collar tightly about a steering column, said sections having outstanding annular flanges provided with upstanding lips, inner and outer contact strips fitting against inner and outer faces of said lips, tongues carried by said strips, fastening devices passing through said tongues and securing same to the flanges of said sections, certain of said fasteners constituting terminals for engagement by conductor wires, one end of the inner strip being curved outwardly across the corresponding end of the outer strip and the outer strip having its other end curved inwardly across the corresponding end of the inner strip, and a movable contact member adapted to be secured to the hub of a steering wheel in position to normally extend between the spaced ends of the collar sections and be guided into engagement with the contact strips by the curved ends thereof when the steering wheel is turned.

3. In a device of the character described, a collar formed of arcuate sections having outstanding horizontal flanges and vertical lips carried thereby, means to secure the collar tightly about a steering column, inner and outer annular contact strips secured against inner and outer faces of said lips in insulated relation to each other and each having its ends terminating in spaced relation to each other, the inner strip having one end curved outwardly to form a cam surface and the outer strip having one end curved inwardly to form a cam surface, and a movable contact adapted to be secured to a portion of a steering wheel and having a portion normally disposed between the spaced ends of the strips and adapted to be guided into engagement with the contact strips when the steering wheel is turned.

4. In a device of the character described, a collar adapted to be secured about a steering column, inner and outer annular contact strips carried by the collar in laterally spaced insulated relation to each other and in substantially concentric relation to the steering column and each other, said contact strips having guiding lips spaced from each other circumferentially of the collar, and a movable contact consisting of a bracket adapted to be secured to the hub of a steering wheel and project radially therefrom, and a contact bar adjustable through the bracket longitudinally of the steering column into position between the lips for individual engagement with the lips and thereby allow the contact bar to be guided into engagement with a predetermined one of the contact strips when the steering wheel is turned in a predetermined direction.

5. In a device of the character described, a collar adapted to be secured tightly about a steering column, concentric inner and outer annular contact strips carried by said collar in substantially parallel laterally spaced insulated relation to each other and each having its ends spaced from each other, one end portion of the outer strip being curved to form an inwardly extending cam surface, the inner contact strip having one end portion curved to form an outwardly extending cam surface spaced from the inwardly extending cam surface circumferentially of the collar, and a movable contact adapted to be secured to a portion of a steering wheel with a portion extending therefrom in position to engage the cam surfaces and be guided thereby into engagement with predetermined contact strips when the wheel is turned.

LYDIA A. HAGLER.
SIDNEY E. SMITH.